United States Patent Office 3,595,788
Patented July 27, 1971

3,595,788
FILTER FOR SEPARATING SUPERFLUID HELIUM
Wilhelmus Franciscus Knippenberg and Gerrit Verspui, Emmasingel, Eindhoven, Netherlands, assignors to U.S. Philips Corporation, New York, N.Y.
Filed Apr. 8, 1970, Ser. No. 26,696
Claims priority, application Netherlands, Apr. 16, 1969, 6906104
Int. Cl. B01d 39/00
U.S. Cl. 210—500      2 Claims

ABSTRACT OF THE DISCLOSURE

A filtering element for separating superfluid helium from liquid helium, characterized in that the filtering element consists of coherent microporous silicon carbide which is electrically conductive at least superficially due to additions (donors and/or acceptors) determining the conductivity properties, said element comprising current supply contacts.

---

The invention relates to a filter for separating superfluid helium from liquid helium. Such filters are sometimes referred to by the name of "superleak."

In Dutch patent application 6716438 such a filter has been described which consists of coherent microporous silicon carbide, which filter shows considerable advantages over the prior conventional filters of microporous glass ("Vyctor" glass) and the filters consisting of compressed layers of finely divided powdered materials, for example, iron oxide, aluminium oxide and carbon (Physical Rev. Letters, vol. 19, No. 9, 1967, p. 488).

Advantages of the silicon carbide filtering elements are, inter alia, that they can be degassed more easily, that the heating to room temperature can be effected more rapidly and with fewer precautions, that they can more readily be handled and can be incorporated in a glass apparatus by sealing.

According to the invention, the possibilities of application of the microporous filters of silicon carbide can be considerably extended by constructing the filtering element of silicon carbide in such manner that it can be heated by the passage of current.

The invention relates to a filter for separating superfluid helium from liquid helium, characterized in that the filtering element consists of coherent microporous silicon carbide which is electrically conductive at least superficially due to a content of additions (donors and/or acceptors) determining the conductivity properties, said element comprising current supply contacts.

As a result of these measures, the filtering element can be rapidly heated by the passage of current to such temperatures that the permeability of superfluid helium is reduced or entirely removed. Thus a filter is available having a controllable permeability which may also be used as a cock.

The overall permeability of the filtering elements can of course be adjusted by the thickness, the cross-section and the microporosity.

Microporous silicon carbide is to be understood to mean herein a material having pores which are in communication with each other and have diameters of at most 100 A., for example, 50 A.

Such coherent microporous silicon carbide can be obtained by sintering powder having a grain size of a few hundredths of a μm. to a few tenths of μm.

As a starting material may be used silicon carbide obtained by an etching process or another known gaseous phase reaction, and in addition powder of silicon, quartz or carbon which is converted into silicon carbide in a vapour containing carbon and silicon, respectively. It is not necessary for the good operation of the filters that the conversion into silicon carbide is complete. In connection herewith the term silicon carbide should be understood to include such products which are converted into silicon carbide only superficially.

The sintering can be carried out under pressure and, as is conventional in sintering technology, binders, mineralizers and metals may be added in small quantities.

If desirable, the microporosity can be given the correct value by an after-treatment. For that purpose, the sintering body can be impregnated with a colloidal solution of carbon or with a solution of a carbonizable resin and then be heated in a silicon-containing atmosphere, for example, silicon monoxide, as a result of which silicon carbide is formed in the pores and a decrease in the pore-size is achieved.

Increasing the density of the material can also be obtained by an after-heating in an atmosphere which contains carbon and silicon, for example, a methyl chlorosilane, under a low partial pressure, for example, 0.01 mm. mercury pressure.

Furthermore, the filtering elements of silicon carbide according to the invention can be obtained by a pyrolytic deposition, for example, from a mixture of a methyl chlorosilane with hydrogen, on a substrate, by conversion of bodies of porous carbon, silicon or quartz, in an atmosphere containing silicon and carbon, respectively, or by sublimation. The deposition, conversion and sublimation, respectively, must be carried out, naturally while taking into account parameters such as temperature, time and concentrations, in such manner that a microporous material is formed. If desirable, the increase in the density of the material can be obtained in these cases by the above-described after-treatment.

As already noted above, the electric conductivity also at the low temperatures at which the filtering elements are used here, can be effected by additions of donors and/or acceptors known in semiconductor technology.

The incorporation of the additions can take place via the gaseous phase, during the formation of the silicon carbide or the sublimation. It is alternatively possible to introduce the additions during the sintering or to cause the finished filtering elements to absorb the additions by an after-treatment by means of a diffusion process so that electric conductivity is obtained at least superficially.

The silicon carbide is preferably given an electric conductivity which varies little with the temperature because this facilitates the correct adjustment of the temperature of the filtering element.

For that purpose, the element can be given a weak negative temperature coefficient of the resistance by the addition of nitrogen, while boron and aluminium in a low dose result in a larger, although not yet annoyingly large, negative temperature coefficient.

For a good operation of the filters it is of importance that the filtering elements are provided with good electric contacts.

For that purpose are to be considered, for example, alloys of gold and tantalum, preferably with 5% by weight of tantalum which, as is known, can result in very readily adhering contacts by alloying. Further suitable contact metals are alloys of 98% by weight of nickel with 2% by weight of molybdenum, and alloys of 80% by weight of platinum and 20% by weight of tin.

It is alternatively possible to incorporate pins of tungsten as current supply contacts during the formation of the filtering elements or by sintering.

In order to prevent that rectifying contacts are formed during the contacting of silicon carbide which is p-conductive by the addition of acceptors, an acceptor may also be added, as is known, to the contact metals. Such a measure is not necessary when using silicon carbide which is n-conductive by a donor addition, such as nitrogen.

The filtering elements according to the invention can be readily sealed in hard glasses, such as borosilicate glasses, in which current supply conductors can be passed through the glass. Filters thus obtained can easily be incorporated in the apparatus to be used by glass seals.

In order that the invention may be readily carried into effect, it will now be described in greater detail with reference to a few examples and the accompanying drawing.

EXAMPLE 1

Silicon carbide powder obtained according to the Acheson process and having a grain size of 1 μm. is heated in a graphite crucible in a nitrogen atmosphere at 2200° C. for 3 hours. The sintering element formed is sliced in slices of 5 mm. thickness and 25 mm. diameter.

The slices are then impregnated with a colloidal graphite solution and heated in an atmosphere of hydrogen with 10% nitrogen at 2000° C. for 3 hours, in which silicon monoxide is developed from quartz sand. By this treatment, which may be repeated, if necessary, filtering elements of the required density are obtained.

Figure 1:
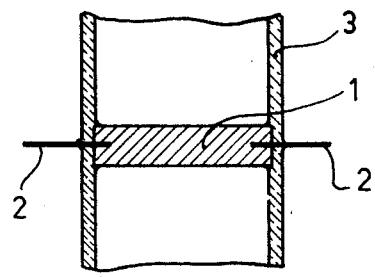
FIG. 1 is a cross-sectional elevation of one embodiment of this invention.

As is shown in the cross-sectional view of FIG. 1 of the accompanying drawing, a filtering element 1 thus obtained is provided with tungsten contact pins 2, 0.5 mm. thick. This may be carried out by sintering the tungsten pins at 2000° C. in a protective gas to the silicon carbide, or by a soldered joint which can be produced by means of an alloy of gold with 5% of tantalum.

The assembly is sealed in a tube 3 of borosilicate glass.

By sintering in a nitrogen-containing atmosphere and free silicon and/or carbon present possibly as a result of the after-treatment with colloidal graphite and silicon monoxide, the slices are readily electrically conductive.

The resistance of the filter is 10 ohm at 20° C. and 20 ohm at the temperature of liquid helium.

Upon separation of superfluid helium from liquid helium the filter can rapidly be heated by the passage of current so that the permeability of superfluid helium can be reduced or removed.

EXAMPLE 2

Figure 2:
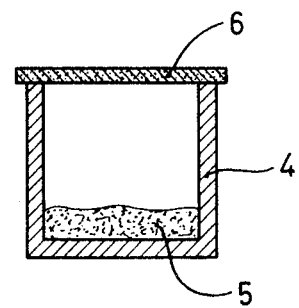
FIG. 2 is a cross-sectional elevation of another embodiment of the invention.

As shown in FIG. 2 of the drawing, nitrogen-doped silicon carbide powder 5 is provided in a graphite crucible 4. The crucible 4 is closed with a graphite plate 6 and the assembly is heated in a nitrogen atmosphere. At a temperature of 2600° C. of the crucible 4 and a temperature of 2400° C. of the cover plate 6, a contact layer 7 of microporous polycrystalline silicon carbide deposits on said plate by sublimation and/or by decomposition and recombination of the silicon carbide 5, which layer has reached a thickness of 6 mm. in 5 hours.

After burning away the graphite cover plate 6 in air, the sublimated nitrogen-doped plate of silicon carbide is ground down to a thickness of 5 mm. and sliced in 20-mm.-slices. In the manner as described in Example 1, said slices are provided with current supply members and sealed in borosilicate glass.

What is claimed is:

1. A filtering element for separating superfluid helium from liquid helium, characterized in that the filtering element consists of coherent microporous silicon carbide which is electrically conductive at least superficially due to a content of additions of donors or acceptors determining the conductivity properties, said element comprising current supply contacts.

2. A filter consisting of a filtering element as claimed in claim 1 sealed in a body of hard glass and comprising current supply conductors which are passed through the glass.

References Cited

UNITED STATES PATENTS 3,192,730   7/1965   Webb _____ 62—42X

REUBEN FRIEDMAN, Primary Examiner

R. W. BURKS, Assistant Examiner

U.S. Cl. X.R.

62—42

PO-1050
(5/69)

UNITED STATES PATENT OFFICE
CERTIFICATE OF CORRECTION

Patent No. 3595788             Dated July 27, 1971

Inventor(s) WILHELMUS FRANCISCUS KNIPPENBERG ET AL

It is certified that error appears in the above-identified patent and that said Letters Patent are hereby corrected as shown below:

Col. 1, line 7, "April 16, 1969" should be

--April 18, 1969--

Signed and sealed this 9th day of May 1972.

(SEAL)
Attest:

EDWARD M. FLETCHER, JR.          ROBERT GOTTSCHALK
Attesting Officer                  Commissioner of Patents